United States Patent [19]

Steilen

[11] 4,410,194
[45] Oct. 18, 1983

[54] CASTER WHEEL BRAKE

[75] Inventor: Ronald M. Steilen, Ankeny, Iowa

[73] Assignee: Deere & Company, Moline, Ill.

[21] Appl. No.: 277,418

[22] Filed: Jun. 25, 1981

[51] Int. Cl.³ .............................................. B62D 13/04
[52] U.S. Cl. ...................................... 280/86; 172/386; 16/35 D
[58] Field of Search .............. 280/86, 89 US, 272 US, 280/62 US, 78 US; 172/383, 386; 16/35 R, 35 D; 188/67, 83, 131

[56] References Cited

U.S. PATENT DOCUMENTS

| | | | |
|---|---|---|---|
| 1,375,419 | 4/1921 | Schuler | 280/89 |
| 2,367,993 | 1/1945 | Bishop | 16/35 |
| 2,388,874 | 11/1945 | Seaholm | 97/127 |
| 2,482,961 | 9/1949 | Bishop | 16/35 |
| 2,508,057 | 5/1950 | Bishop | 244/50 |
| 2,557,275 | 6/1951 | Geisse | 244/100 |
| 2,693,003 | 11/1954 | Fuente | 16/35 |
| 2,699,341 | 1/1955 | Brettrager | 172/386 |
| 2,761,692 | 9/1956 | Sisulak | 280/62 |
| 2,770,832 | 11/1956 | Martin | 16/35 |
| 3,690,413 | 9/1972 | Airheart | 188/67 |
| 4,026,365 | 5/1977 | Andersson et al. | 172/386 |
| 4,154,451 | 5/1979 | Young | 280/86 |
| 4,190,274 | 2/1980 | Gross et al. | 188/67 |

OTHER PUBLICATIONS

Operator's Manual, OM-N159510 Issue C9, Two-Drill Hitch for 8000 Series Grain Drills, pp. 30 and 31.

Primary Examiner—Robert R. Song
Assistant Examiner—Dennis Pedder

[57] ABSTRACT

For an implement, a caster wheel assembly including a tubular member connected to reciprocate as the caster wheel swivels. An adjustable brake assembly resists movement of the tubular member to eliminate caster wheel wobble as the implement is transported. A plurality of caster wheel assemblies permit the implement to crab between the towing vehicle and a trailing implement. The brake assemblies provide convenient locking and control of selective wheels for the desired swivel action in numerous operating situations.

17 Claims, 4 Drawing Figures

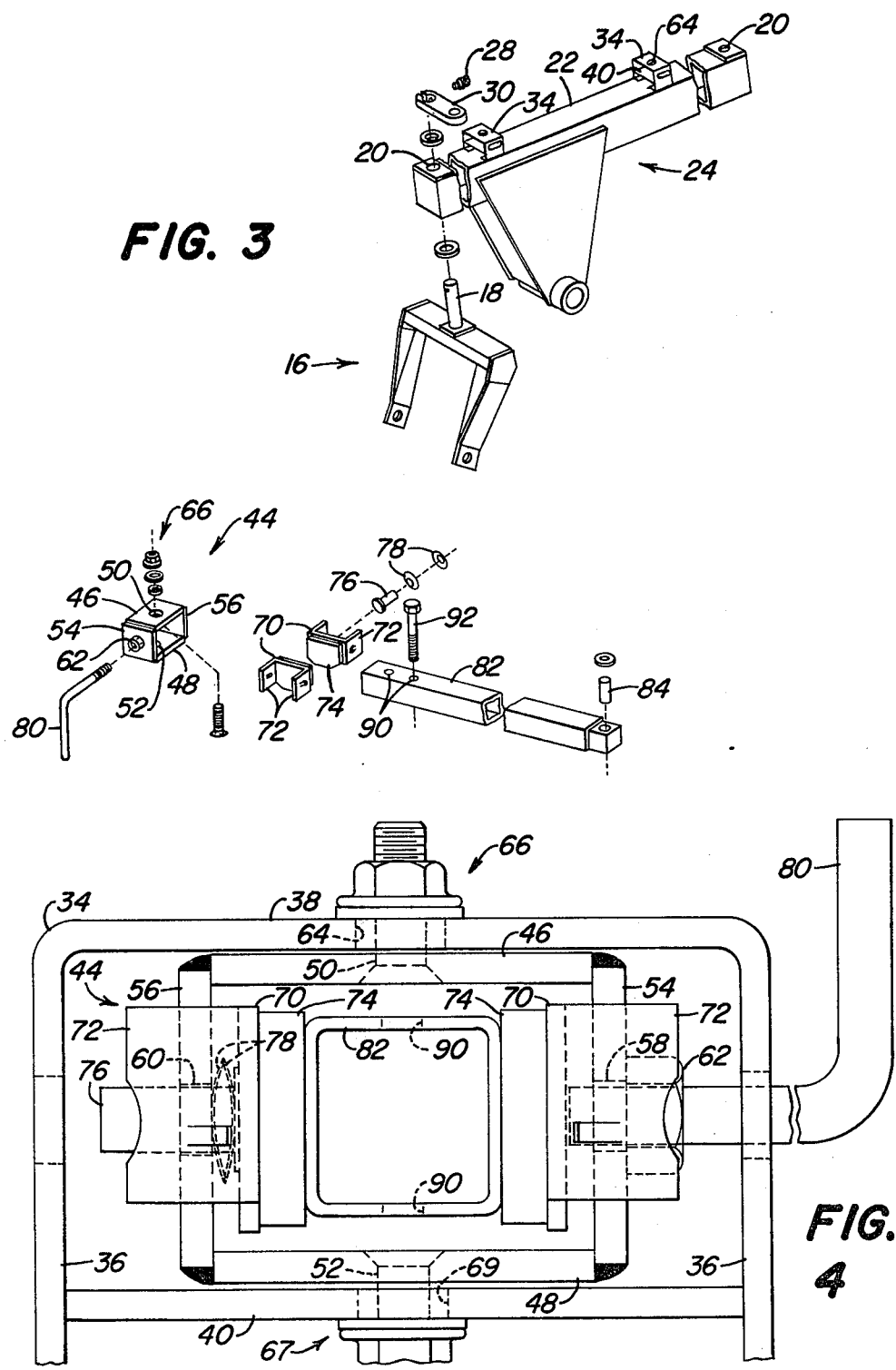

CASTER WHEEL BRAKE

BACKGROUND OF THE INVENTION

The present invention relates generally to an implement supported on caster wheels, and more specifically to a device for controlling caster wheel motion.

Caster wheels are commonly used on agricultural equipment to prevent skidding of a wheel or wheels when the implement is turned. These wheels can cause a problem when transporting the machine at higher than field-operating speeds by wobbling or attempting to rotate about their caster frame vertical spindle. This action can cause such problems as tire wear, structural damage or loss of control of the machine. In some previously available implements with caster wheels, the caster wheels have been rigidly pinned to prevent oscillation, but such an arrangement causes the wheel to skid and results in high stresses in the structural members when the implement is turned.

Other previously available devices, such as the caster wheel assembly shown in U.S. Pat. No. 2,761,692 include a friction disk fixed to the spindle and engaging a friction plate interlocked with the framework and spring-urged downwardly. Such a device is relatively expensive, since it requires special castings or the like. Swivel wheel dampers for the caster wheels of aircraft 20 have also been available for some time, but these devices are also relatively complicated and expensive to manufacture. Examples of such aircraft devices are shown in U.S. Pat. Nos. 2,367,993; 2,482,961; 2,508,057; 2,693,003 and 2,770,832. U.S. Pat. No. 2,388,874 shows a caster wheel with an arm that is spring-loaded to restore the wheel to its operating position from any castered position. At transport speeds, wobbling would still be present with such a device.

In certain applications, such as when a seeder is towed behind a grain cart, and the grain cart, in turn, is towed behind a tractor or the like, the cart is supported on four caster wheels spaced fore-and-aft in pairs. In some situations it is desirable that all the wheels be able to caster freely, while in other situations it is necessary to limit the castering of a front or rear pair of wheels while permitting the remaining wheels to caster freely. Heretofore, devices for selectively locking the caster wheel in position or alternately adjustably braking the caster action have been relatively expensive or ineffective and often have been difficult to adjust for the proper caster wheel action.

BRIEF SUMMARY OF THE INVENTION

It is, therefore, an object of the present invention to provide an improved caster wheel assembly for an implement.

It is a further object of the invention to provide an improved caster wheel assembly for an implement for preventing wobble from starting when the vehicle is towed at higher than field-operating speeds. It is another object to provide such an assembly which is relatively inexpensive and easy to adjust.

It is a further object of the invention to provide an improved damping device for a caster wheel which allows the caster wheel to pivot freely 180 degrees when turning or backing, but prevents wobble or oscillation of the caster wheel at transport speeds. It is a further object to provide such an assembly wherein the resistance to swiveling of the caster wheel is easily adjusted.

It is still another object of the invention to provide a caster wheel assembly with an elongate member which reciprocates in response to castering of the wheel and which has a braking device which adjustably resists the reciprocating motion of the member.

It is yet another object of the invention to provide a cart or similar implement with a plurality of supporting caster wheels which includes a plurality of caster wheel control devices which may be quickly and easily adjusted to resist or prevent castering of preselected combinations of the wheels.

In accordance with the above objects, a control arm is rigidly connected to the caster wheel frame vertical spindle. An elongated tubular member or brake tube is pivotally connected to the end of the control arm and reciprocates as the caster wheel casters about its vertical axis. The break tube slides between a pair of brake pads mounted in a support carried by the cart frame. A threaded handle in the support allows adjustment of the pressure exerted by the brakes against the brake tube. With proper adjustment of the brake pads, the caster wheel is free to pivot 180 degrees when turning or backing the machine, but the resistance provided by the brake prevents wobble or oscillation of the caster wheel at transport speeds. One or more of the caster wheels can be locked in position by inserting pins in the brake tube to prevent relative reciprocation between the tube and the support. The device is relatively simple and inexpensive to manufacture and provides for easy adjustment of the resistance to castering of the caster wheels. The braking action prevents tire wear and structural damage during transporting of the machine by preventing wobbling of the caster wheel. With proper adjustment of the braking device, the wheel can still caster during turns to prevent skidding action of the wheel and eliminate high stresses in the structural members.

BRIEF DESCRIPTION OF THE DRAWINGS

FIG. 3 is an exploded view of a portion of the assembly shown in FIG. 2.

FIG. 4 is a detailed view of the brake support assembly shown in FIG. 2.

DESCRIPTION OF THE PREFERRED EMBODIMENT

Figure 1:
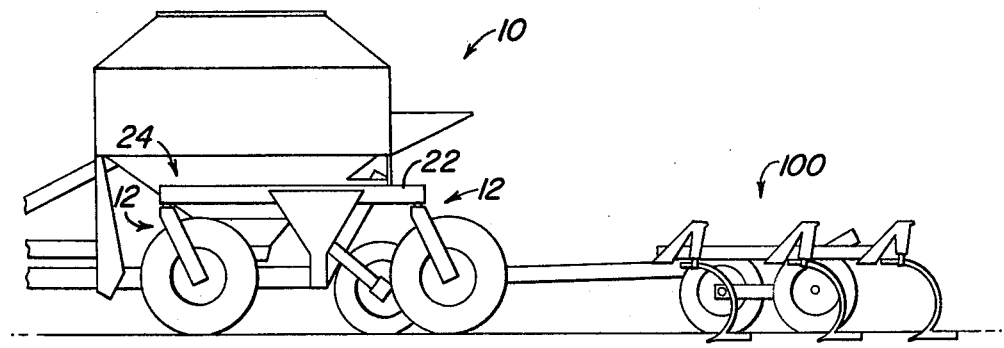
FIG. 1 is a perspective view of an implement utilizing the device of the present invention.

Referring now to FIG. 1, therein is shown an implement 10 supported for forward movement over the ground by a plurality of caster wheels 12. The implement 10 is shown as a grain drill cart for an air seeder, but it is to be understood that the present invention may be utilized with other implements. Each caster wheel 12 is rotatably mounted on a horizontal axle 14 of a caster wheel frame assembly 16 having a vertical spindle 18 offset in the forward direction from the axle 14. The vertical or upright spindle 18 is journalled in a bearing member 20 carried by a fore-and-aft extending beam 22 of cart frame assembly 24. As seen in FIG. 1, the cart frame assembly includes a pair of transversely spaced and generally parallel fore-and-aft beams 22, and each beam supports a pair of caster wheel assemblies at its opposite ends.

The vertical spindle 18 of each caster wheel assembly extends upwardly through its associated bearing member 20 and terminates in an upper end located above the beam 22. A control arm member 30 which is part of a caster wheel control assembly is rigidly attached to the upper end by a set screw 28 and rotates with the spindle 18 as the caster wheel swivels. In the preferred embodiment, the control arm 30 is fixed such that its axis is substantially parallel to the axis of the caster wheel 12 so that as the wheel pivots 90 degrees in either direction from the forward direction, the arm member approaches a position generally parallel to the beam 22. A guide member or bracket 34 is welded to the beam 22 at a position offset from the axis of the vertical spindle 18. The bracket 34 is located outside of the arc that the end of the control arm 30 traverses as the caster wheel swivels.

The bracket 34 includes a generally U-shaped outer portion having upright sidelegs 36 welded to the beam 22 and a transverse bight portion 38 extending between the sidelegs. A lower support plate 40 is welded to the sidelegs 36 and extends parallel to the bight portion 38.

A brake support assembly 44 having a generally open-ended box structure is pivotally supported inside the bracket 34. The assembly 44 includes parallel and substantially horizontal top and bottom plates 46 and 48, respectively, with central pivot-receiving apertures 50 and 52. Side plates 54 and 56 are welded to and space the plates 46 and 48. The plates 54 and 56 include centrally located apertures 58 and 60, respectively. A nut 62 is welded to the plate 54 in alignment with the aperture 58. The aperture 50 in the plate 46 is aligned with a hole 64 in the bight 38 of the bracket 34, and a vertical pivot assembly 66 is inserted through the aperture and hole. Likewise, a pivot assembly 67 is inserted through the aperture 52 and a corresponding axially aligned hole 69. The pivot assemblies 66 and 67 maintain the brake support assembly 44 within the bracket 34 while allowing the assembly 44 to pivot about an upright axis.

A pair of U-shaped brake pad members 70 are supported in the assembly 44 with leg portions 72 extending outwardly beyond the sides of the plates 54 and 56. Brake pads 74 are supported generally parallel to the plates 54 and 56. A pin 76 is inserted through a pair of opposed thrust washers 78 and through the hole 60 in the side of plate 56 to urge the corresponding brake pad member 70 inwardly from the sidewall 56. A threaded handle member 80 is screwed into the nut 62 to urge the opposite brake pad member 70 inwardly in the direction of the first mentioned pad member.

An elongated rod member or brake tube 82 having a rectangular cross section is connected at one end by a pivot pin assembly 84 to the outer end of the control arm member 30. The brake tube 82 extends through the support member 34 between the opposed brake pads 74 and between the upper and lower plates 46 and 48. The handle 80 is screwed inwardly to increase the pressure of the pads 74 against the sides of the brake tube 82 and, thereby, adjust the pressure applied by the brake pads 74 to the opposite sides of the brake tube 82.

As the caster wheel 12 swivels back and forth, the control arm member 30 pivots with the spindle 18 to reciprocate the brake tube 82 within the bracket 34. The recriprocating motion of the brake tube 82 is resisted by the brake pad members 70 with the amount of resistance provided depending upon the adjustment of the handle 80. As the angle of the brake tube 82 changes with the position of the control arm 30, the brake support assembly 44 pivots within the bracket 34 about the upright axis so that the brake pads 74 are maintained flatly against the sides of the tube 82. Apertures 90 are provided in the top and bottom surfaces of the tube 82 which, when the caster wheel is positioned for forward movement over the ground, (FIG. 2) are located on opposite sides of the bracket 34. To lock the caster wheel in this position, pins 92 are inserted in the holes to prevent the tube from recriprocating within the bracket.

Figure 2:
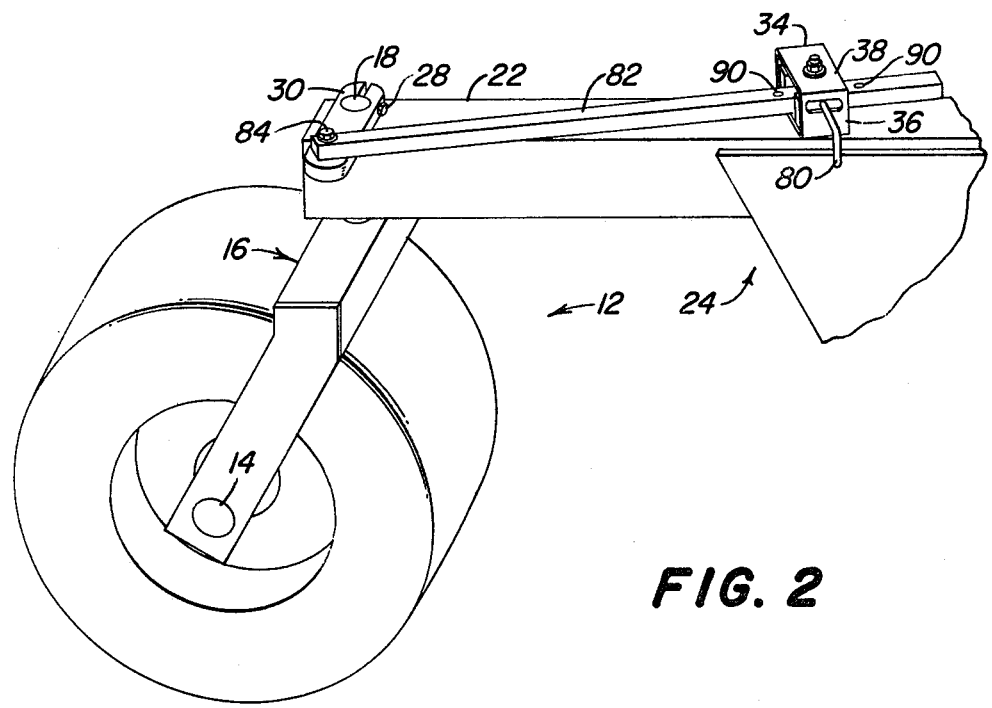
FIG. 2 is a perspective view of one of the rear caster wheel assemblies utilized with the implement of FIG. 1 with the wheel in position for forward movement.

When the cart 10 is operating in the field behind a towing vehicle and forwardly of a towed implement such as a grain drill or a seeder 100 (FIG. 1), the brake pads 74 are adjusted away from the brake tube 82 by turning the handle 80 so that all four caster wheels 12 can freely caster in any direction. When the cart 10 is pulled at transport speeds with the rear implement attached, the brake pads 74 are tightened against the brake tube 82 so that there is sufficient resistance or drag to prevent the caster wheel from oscillating. This adjustment is accomplished by turning the handle 80 until the brake pads 74 contact the sides of the brake tube 82 and, thereafter, turning the handle an additional fraction of a turn. All four caster wheel brakes are adjusted in the same manner. However, when the cart 10 is being towed by the tractor without an implement attached behind the cart, it is desirable that the front wheels be able to pivot while the rear wheels are held firmly in a straight line for forward movement. In this situation, the pins 92 are inserted through each rear wheel brake tube 82 on each side of the corresponding brackets 34 when the rear wheels are in position for forward movement (FIG. 2). The front wheel brake pads 74 are adjusted as described above so there is sufficient drag on the associated brake tubes 82 to prevent the wheels from oscillating while traveling at transport speeds. Therefore, the caster wheel control assemblies can be utilized to switch between a first situation where the cart is towing an implement and a crabbing action is required to a second situation where the cart is pulled like a trailer and only the front wheels 12 need to caster. The braking action of each caster wheel control assembly can be easily adjusted to prevent oscillations or wobble from starting while permitting the desired wheels to caster during turns.

As best seen in FIG. 2, maximum resistance to swivel occurs when the wheel is positioned for movement in the forward direction because of the angle of the control arm 30. Once the wheel begins to swivel, the effective moment arm acting to resist swivel decreases. Therefore, when the cart 10 is being towed at transport speeds with the brake pads 70 tightened against the brake tube 82, any tendency of the wheel to begin to wobble is resisted with maximum force. However, resistance decreases as the caster wheel swivels from the forward direction to reduce side loading on the assembly during turns.

Having described the preferred embodiment, it will be apparent that modifications can be made without departing from the scope of the invention as defined in the accompanying claims.

I claim:

1. In a framed implement adapted for forward movement over the ground and having a caster wheel adapted for rocking to and from a forward direction about an upright axis, caster wheel control means for limiting oscillation of the caster wheel comprising: first means movably supported with respect to the frame; second means connecting the first means for movement with the caster wheel as the latter rocks, said second means defining an effective moment arm through which the caster wheel acts to move the first means, said moment arm decreasing as the caster wheel moves from the forward direction; and third means for adjustably resisting movement of the first means.

2. The invention as set forth in claim 1 wherein the first means comprises a brake tube and the second means comprises an arm member rotatable with the caster wheel about the upright axis and having a radially outward portion pivotally connected to the brake tube.

3. The invention as set forth in claim 1 or 2 wherein the third means includes adjustable brake pads supported by the frame and brake pad adjusting means for adjustably urging the pads into contact with the first means.

4. In a framed implement adapted for movement forwardly over the ground and having a caster wheel including an upright spindle rotatably supported by the frame to provide caster action of the wheel, a caster wheel control assembly comprising: an arm connected for rotation with the spindle through an angle of about 180 degrees in either direction from the forward direction, a brake member supported by the frame offset a generally fixed distance from the axis of the spindle and including a pair of brake surfaces adjustably spaced with respect to each other, an elongated and generally straight rod member extending between the brake surfaces and in frictional contact therewith, means pivotally connecting the rod member to the arm for causing reciprocal motion of the rod member with respect to the brake surfaces while maintaining the axis of the rod parallel to said surfaces as the arm rotates through the angle; and means urging the brake surfaces toward each other and against the rod member for adjustably resisting reciprocal motion of the rod member and thereby preventing free castering of the wheel.

5. The invention as set forth in claim 4 further comprising means pivotally connecting the brake member to the frame for permitting the brake surfaces to rock into alignment with the rod member as the latter moves with the arm.

6. The invention as set forth in claim 4 or 5 further comprising means for fixing the rod member with respect to the brake member and preventing castering of the wheel.

7. The invention as set forth in claim 4 or 5 wherein the rod member is a hollow tube having a rectangular cross section.

8. In a framed implement, a caster wheel pivotally connected to the frame and freely rockable about an upright pivotal axis, an arm member having a first end connected to the caster wheel and a second end offset from the pivotal axis and movable in an arc about the axis with the caster wheel as the latter rocks through an angle of up to at least 180 degrees, an elongated member having a rectangular cross section pivotally connected to the second end, guide means connected to the frame a generally fixed distance from the pivotal axis and slidably receiving the elongated member therethrough for generally reciprocal motion as the second end moves with the caster wheel, and adjustable brake means supported by the guide means and contacting the elongated member for resisting the reciprocal motion of said member and limiting the free pivoting of the caster wheel.

9. The invention as set forth in claim 8 wherein the brake means comprises first and second brake pads supported by the guide means on opposite sides of the elongated member, means for biasing the second pad toward the first, and means for adjustably positioning the first pad with respect to the second pad and varying the resistance to the reciprocal motion.

10. In a framed implement supported for forward movement over the ground by a caster wheel wherein the caster wheel includes an upright spindle supported on the frame for swiveling about an upright axis, caster wheel control structure comprising a first member connected to the upper end of the spindle for rotation therewith as the caster wheel swivels, a guide connected to the frame, a straight rod-like member having a first portion pivotally connected to the first member and movable therewith and a second portion constrained by the guide to move in generally a reciprocating fashion as the spindle rotates, said rod-like member offset from the first member in non-interfering fashion to permit the caster wheel to rotate through an angle of approximately 360 degrees and to thereby reciprocate the rod-like member during the rotation through said angle, brake means supported by the frame and contacting the second portion for resisting the reciprocal motion of the rod-like member and thereby limiting the free pivoting of the caster wheel throughout its rotation through said angle.

11. The invention as set forth in claim 10 wherein the guide includes a brake pad support pivotally connected to the frame, and wherein the brake means includes a pair of spaced brake pads carried in the support, said second portion of the rod-like member retained between the brake pads.

12. The invention as set forth in claim 11 including adjusting means for adjustably urging the pads into contact with the second portion.

13. In a towed implement, caster wheel support and control assembly comprising: first and second transversely spaced fore-and-aft extending beams, a caster wheel supported for swiveling about an upright axis at each end of the beams and including an arm member defining a moment arm, said arm member movable with the wheel as it casters through an angle of at least about 180 degrees, a guide member supported on the beam inwardly from each end, a brake tube pivotally connected to each arm member and constrained to reciprocate in generally the fore-and-aft direction by the guide member as the corresponding wheel swivels through said angle, said tube acting through the moment arm to resist free swiveling of the caster wheel about its upright axis, brake means adjustably bearing against the brake tube for adjustably resisting reciprocation and thereby adjustably limiting free swiveling of the caster wheel, and wherein said arm member is located at approximately 90 degrees to the forward direction of the caster wheels and the effective moment arm through which the brake tube operates to limit free swiveling decreases as the caster wheel swivels away from the forward direction.

14. In a towed implement including a frame supported for forward movement over the ground by at least three caster wheels and adapted for attachment between a leading towing vehicle and a trailing implement, wherein the caster wheels are freely pivotable about upright axes and include one pair of caster wheels spaced fore-and-aft to permit the towed implement to crab between the trailing implement and the towing vehicle, caster wheel control means for selectively controlling the swiveling of individual caster wheels, comprising: first braking means for selectively restricting the free pivoting of at least the forward caster wheel including an arm connected to rotate with the caster wheel about its upright axis through an angle of at least approximately 180 degrees, a brake tube connected to the arm and movable therewith, guide means mounted on the frame and slidably receiving the brake tube for permitting the brake tube to reciprocate with respect thereto as the arm rotates with the caster wheel through said angle, and adjustable brake pad means supported by the frame and resistively bearing against the brake tube for providing a variable resistance to the reciprocal motion and thereby causing resistance to free pivoting of the forward caster wheel, and locking means for selectively locking the aft caster wheel against rotation about its upright axis.

15. The invention as set forth in claim 14 further comprising second braking means substantially identical to the first braking means associated with the aft caster wheel for adjustably resisting free pivoting of the aft caster wheel about its upright axis when said caster wheel is unlocked, and wherein the locking means includes means for selectively preventing the brake tube associated with the second braking means from reciprocating.

16. The invention as set forth in claim 14 or 15 including a second pair of fore-and-aft spaced caster wheels and additional braking means substantially identical to the first braking means associated with each caster wheel of the second pair.

17. The invention as set forth in claim 14 or 15 wherein the brake tube of the first braking means acts through an effective moment arm, said moment arm decreasing as the caster wheel swivels from the forward direction.

* * * * *